United States Patent Office 3,022,328
Patented Feb. 20, 1962

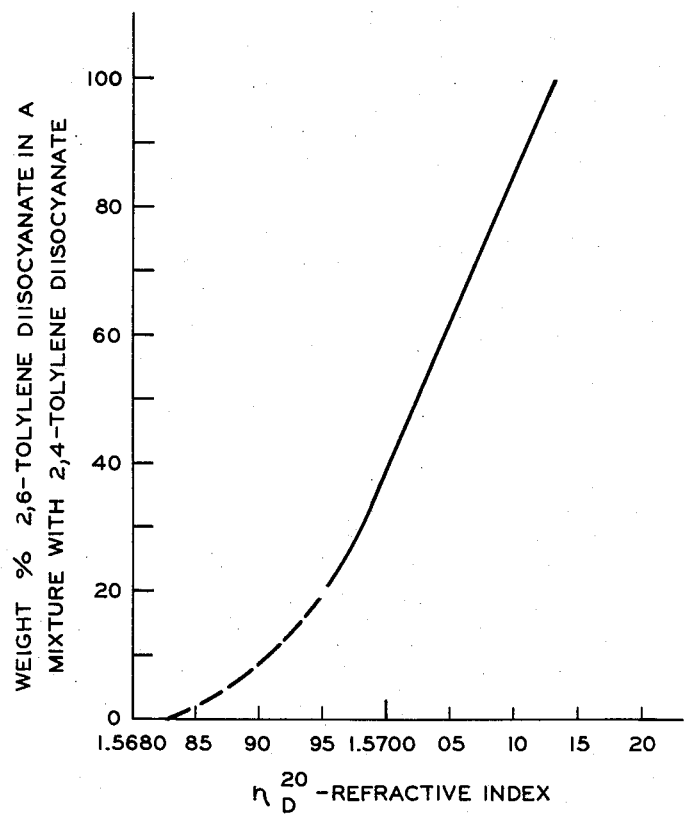

3,022,328
SEPARATION OF ISOMERS OF TOLYLENE DIISOCYANATE
Raymond L. Cobb, Bartlesville, Okla., assignor to Phillips Petroleum Company, a corporation of Delaware
Filed May 9, 1958, Ser. No. 734,362
12 Claims. (Cl. 260—453)

This invention relates to the separation of chemical isomers. In one aspect it relates to the separation of isomers of tolylene diisocyanate.

Diisocyanates are becoming of increasing commercial interest in the manufacture of urethane type polymers. Tolylene diisocyanate, for example, can be reacted with various polyesters to produce high molecular weight products. The properties of the resulting polymer can depend on the particular isomer of tolylene diisocyanate which is employed. For this reason, it is often desirable to treat mixtures which contain two or more isomers to effect separation of the isomers.

It is an object of this invention to provide an improved process for the separation of isomers of tolylene diisocyanate.

Another object of the invention is to provide a process for separating the 2,6-isomer of tolylene diisocyanate from diisocyanate isomers having an isocyanate group in the 3, 4 or 5 position with respect to the methyl group.

These and other objects of the invention will become more readily apparent from the following detailed description and discussion.

The foregoing objects are achieved broadly by reacting a tolylene diisocyanate mixture containing at least one isomer having an isocyanate group in the 3, 4 and 5 position and the 2,6-isomer, with an alcohol containing from 4 to 14 carbon atoms represented by the formula

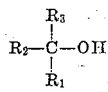

wherein $R_1$ can be a hydrogen, alkyl, aryl, cycloalkyl, alkylcycloalkyl, cycloalkylalkyl, alkaryl, and aralkyl radical, $R_2$ and $R_3$ can be alkyl, aryl, cycloalkyl, alkylcycloalkyl, cycloalkylalkyl, alkaryl and aralkyl radicals, any two R's can be radicals which together with

form a carbocyclic ring structure having 5 to 6 carbon atoms, when $R_1$ is hydrogen at least one of $R_2$ and $R_3$ is selected from the group consisting of a branched alkyl chain, having at least one branch not farther than the second carbon atom from

and a hydrocarbon ring structure having at least 5 carbon atoms, whereby a reaction product is formed between the alcohol and the isomers having an isocyanate group in the 3, 4 or 5 position, and separating the 2,6-isomer from the reaction product.

In one aspect of the invention, the 2,6-isomer is separated from the reaction product by distillation.

In another aspect of the invention, the 2,6-isomer is separated from the reaction product by filtration, centrifugation, decantation or the like.

In still another aspect of the invention, the alcohol-isocyanate reaction products, after isolation, are decomposed by heating and the isocyanates are recovered from the alcohol.

In carrying out the invention, a mixture of tolylene diisocyanates comprising 2,6-tolylene diisocyanate, and at least one isomer having an isocyanate group in the 3, 4 or 5 position, is reacted with an alcohol of the type hereinbefore set forth, at a temperature between about 50 and about 175° C. for a suitable period of time to provide reaction of those isomers containing isocyanate groups in the 3, 4 or 5 positions with the alcohol. It has been found that the latter isomers are highly reactive with the alcohol, whereas the 2,6-isomer reacts at a very slow rate. Specific mixtures which can be resolved in the method of this invention include mixtures of 2,6-tolylene diisocyanate with 2,4-tolylene diisocyanate, 2,5-tolylene diisocyanate or 3,5-tolylene diisocyanate. More than one diisocyanate can be present in the mixture, other than the 2,6-isomer, including any of the 3, 4 or 5 isomers.

The particular temperature employed in carrying out the reaction varies depending on the reaction rate desired. For example, with a temperature of about 50° C. the reaction can be completed in a period of about 10 hours. As the reaction temperature is increased, for example, to 100 to 175° C., the reaction time is reduced in length to 5 minutes or less. The reaction is highly exothermic and tends to be self-accelerating unless dissipation or removal of reaction heat is provided. Control of the reaction temperature and rate can be effected by cooling the reaction mixture, such as, for example, by the use of indirect heat exchange or by introducing a suitable reaction diluent. If a diluent is employed, it can be added to the reaction system initially or at a controlled rate during the reaction, in sufficient quantity to provide the desired temperature level. The diluents which are used are in general materials which are solvents for the diisocyanates, and are inert and in the liquid state under the conditions which exist during the reaction and during the subsequent recovery steps. Suitable solvents include such materials as dibutylphthalate, diethylene glycol monobutyl ether acetate, dioctyl sebacate, dioctyl phthalate, dimethyl ether or diethylene glycol, dimethyl ether of triethylene glycol, diethyl ether of triethylene glycol and the like. Substantial quantities of the diluent or solvent can be used, for example, in amounts up to 10 volumes of solvent per volume of the diisocyanates.

The alcohols which are employed in the invention can contain from 4 to 14 carbon atoms and are represented by the formula

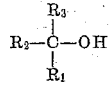

where $R_1$ can be a hydrogen, alkyl, aryl, cycloalkyl, alkylcycloalkyl, cycloalkylalkyl, alkary and aryalkyl radical, $R_2$ and $R_3$ can be alkyl, aryl, cycloalkyl, alkylcycloalkyl, cycloalkylalkyl, alkaryl and arylalkyl radicals, any two R's can be radicals which together with

form a carbocyclic ring structure having 5 to 6 carbon atoms, when $R_1$ is hydrogen at least one of $R_2$ and $R_3$ are selected from the group consisting of a branched alkyl chain, having at least one branch not farther than the second carbon atom from

and a hydrocarbon ring group. Examples of alcohols which can be used include 2-methyl-2-propanol, 2-methyl-2-butanol, 3-methyl-2-butanol, 2-methyl-3-pentanol, 2,3-dimethyl-2-butanol, 3-methyl-2-heptanol, 4-methyl-3-octanol, 4,5-diethyl-3-octanol, 4,6-diethyl-7-methyl-3-nonanol, 3-ethyl-3-octanol, 2-phenyl-2-ethyl-1-butanol, 1-phenyl-1-propanol, 2-phenyl-2-propanol, 4-phenyl-3-methyl-2-butanol, 1-phenyl-1-butanol, 3-phenyl-3-hexanol, 1-phenyl-2-methyl-1-butanol, 1-phenyl-2-methyl-2-propanol, 1,2-diphenylethanol, 4-phenyl-2-methyl-3-hexanol, 3-ethyl-4-phenyl-3-hexanol, 1-cyclopentyl-1-ethanol, 1-cyclohexyl-1-ethanol, 1-cyclopentyl-1-butanol, 2-cyclohexyl-2-pentanol, 2-ethylcyclopentanol, cyclopentanol, cyclohexanol, 3-methylcyclohexanol, and 3,4-dimethylcyclohexanol. The preferred alcohols are the tertiary aliphatic alcohols containing 4 to 14 carbon atoms and more preferably the tertiary aliphatic alcohols containing 4 to 7 carbon atoms. Varying amount of the alcohol can be used; however, when essentially complete separation of the 2,6-isomer is desired, an amount of alcohol at least stoichiometrically equivalent to the isocyanate in the 3, 4, 5 positions is necessary. While an excess of the alcohol can be employed, it is usually desirable to limit the excess to not more than a few percent, for example, not more than about 5 percent.

The reaction product comprises a mixture of compounds formed by the reaction of the alcohol with the highly reactive isomers having isocyanate groups in the 3, 4 and 5 positions, and substantially unreacted 2,6-isomer. The alcohol-isocyanate compounds can be either solids or high boiling liquids. When present in the solid state, these compounds can be recovered by any suitable solid-liquid separation method, such as filtration, centrifugation, decantation, etc. The 2,6-isomer, which remains after removal of the solid product, can be further purified by distillation or other suitable means.

The alcohol-isocyanate compounds are stable at low temperatures but dissociate readily when heated to temperatures above 225° C., usually 250 to 300° C. This property makes these compounds useful as delayed action curing or cross-linking agents in various polymerization and curing processes. If it is desired to recover the isocyanates as such, decomposition of the alcohol-isocyanate reaction products can be effected by heating after which the isocyanates and alcohol can be separated, for example, by distillation.

Separation and recovery of the 2,6-isomer from the reaction product can also be effected by distillation. This method of separation is usually carried out at a temperature below about 225° C. To recover the 2,6-isomer, it is preferred to operate at sub-atmospheric pressures, usually about 100 millimeters of mercury or less. After the 2,6-isomer is recovered from the reaction mixture, the temperature and/or pressure can be increased to the point where decomposition of the alcohol-isocyanate reaction products occurs, after which further separation between the isomers containing isocyanate groups in the 3, 4 and 5 positions and the alcohol can be effected. The recovered alcohol can be reused if desired in the separation of additional 2,6-isomer.

The following data are presented in illustration of the invention.

*Example*

A commercially prepared mixture was obtained which contained in weight percent approximately 65 percent 2,4-tolylene diisocyanate and 35 percent 2,6-tolylene diisocyanate. This commercial mixture had a refractive index, $n_D^{20}$, of 1.5699. An alequot (100 grams) of the mixture was placed in a 250 ml. Claisen flask together with 30 grams of tertiary-butyl alcohol. The mixture was warmed slowly over a 15 minute period to 60 to 70° C., whereupon the reaction rate increased and the exothermic reaction caused the temperature to increase rapidly to 150° C. The reaction was terminated within about 5 minutes as evidenced by a decrease in temperature of the reaction mixture.

The mixture was distilled at a pressure of 3–4 mm. of mercury. The head temperature 97° C., remained essentially constant during the entire distillation period. The overhead product having a boiling point of 97° C. at 3–4 mm. of mercury consisted of 10 cc. of a colorless liquid.

Its index of refraction, $n_D^{20}$, was found to be 1.5710. A correlation of refractive index with weight percent 2,6-tolylene diisocyanate in the mixture is presented in the accompanying figure. It is obvious from this correlation that the product comprises a major proportion of 2,6-isomer, namely about 86 percent by weight.

Having thus described the invention by providing a specific example thereof, it is to be understood that no undue limitations or restrictions are to be drawn by reason thereof and that many variations and modifications are within the scope of the invention.

I claim:

1. A process for separating tolylene diisocyanate isomers which comprises reacting a mixture containing the 2,6-isomer of tolylene diisocyanate, at least one tolylene diisocyanate isomer selected from the group consisting of isomers having an isocyanate group in the 3, 4 and 5 positions with respect to the methyl group and at least one alcohol containing 4 to 14 carbon atoms and represented by the formula

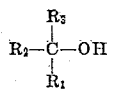

wherein $R_1$ is selected from the group consisting of hydrogen, alkyl, aryl, cycloalkyl, alkylcycloalkyl, cycloalkylalkyl, alkaryl and arylalkyl radical, $R_2$ and $R_3$ are selected from the group consisting of alkyl, aryl, cycloalkyl, alkylcycloalkyl, cycloalkylalkyl, alkaryl and arylalkyl radicals, any two R's being radicals which together with

form a carbocyclic ring structure having 5 to 6 carbon atoms, when $R_1$ is hydrogen at least one of $R_2$ and $R_3$ is selected from the group consisting of a branched alkyl chain, having at least one branch not farther than the second carbon atom from

and a hydrocarbon ring structure having at least 5 carbon atoms, under reaction conditions wherein the temperature is less than the dissociation temperature of the reaction product formed between the alcohol and the 3, 4 and 5 isomers and separating 2,6-isomer from the reaction product.

2. The process of claim 1 in which 2,6-isomer is separated from the reaction product by a solid-liquid separation process.

3. The process of claim 1 in which 2,6-isomer is separated from the reaction product by distillation at a temperature below about 225° C.

4. The process of claim 1 in which the alcohol is a tertiary alcohol.

5. The process of claim 4 in which the alcohol is tertiary butyl alcohol.

6. A process for separating tolylene diisocyanate isomers which comprises reacting a mixture containing the 2,6-isomer of tolylene diisocyanate, at least one tolylene diisocyanate isomer selected from the group consisting of isomers having an isocyanate group in the 3, 4 and 5 positions and at least one alcohol containing 4 to 14 carbon atoms and represented by the formula

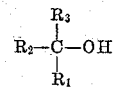

wherein $R_1$ is selected from the group consisting of hydrogen, alkyl, aryl, cycloalkyl, alkylcycloalkyl, cycloalkylalkyl, alkaryl, and arylalkyl radical, $R_2$ and $R_3$ are selected from the group consisting of alkyl, aryl, cycloalkyl, alkylcycloalkyl, cycloalkylalkyl, alkaryl and arylalkyl radicals, any two R's being radicals which together with

form a carbocyclic ring structure having 5 to 6 carbon atoms, when $R_1$ is hydrogen at least one of $R_2$ and $R_3$ is selected from the group consisting of a branched alkyl chain, having at least one branch not farther than the second carbon atom from

and a hydrocarbon ring structure having at least 5 carbon atoms, at a temperature between about 50 and about 175° C. for a time between about 5 minutes and about 10 hours and separating the 2,6-isomer from the reaction product.

7. The process of claim 6 in which 2,6-isomer is separated from the reaction product by a solid-liquid separation process.

8. The process of claim 6 in which 2,6-isomer is separated from the reaction product by distillation at a temperature below about 225° C.

9. The process of claim 6 in which the alcohol is a tertiary alcohol.

10. The process of claim 9 in which the alcohol is tertiary butyl alcohol.

11. A process for separating a mixture of 2,4-diisocyanate and 2,6-diisocyanate which comprises reacting said mixture with tertiary butyl alcohol under reaction conditions wherein the temperature is less than the dissociation temperature of the solid reaction product formed between the 2,4-diisocyanate and the alcohol and separating the 2,6-isomer from the reaction product.

12. A process for separating 2,4-tolylene diisocyanate from 2,6-tolylene diisocyanate which comprises reacting said mixture with tertiary butyl alcohol at a temperature of between about 50 and about 175° C., separating 2,6-isomer from the reaction product by distillation at a temperature of below about 225° C., further heating the reaction product to dissociate the alcohol and 2,4-isomer and separating the alcohol from 2,4-isomer by distillation.

References Cited in the file of this patent

UNITED STATES PATENTS

| | | |
|---|---|---|
| 2,700,060 | Cherlow et al. | Jan. 18, 1955 |
| 2,831,012 | Bernard | Apr. 15, 1958 |

FOREIGN PATENTS

| | | |
|---|---|---|
| 709,288 | Great Britain | May 19, 1954 |

OTHER REFERENCES

Bailey et al.: "Industrial and Engineering Chemistry," April 1956, pages 794–797.